(12) United States Patent
Orioli et al.

(10) Patent No.: US 6,487,933 B2
(45) Date of Patent: Dec. 3, 2002

(54) PEDAL-OPERATED DRIVE UNIT FOR BICYCLES OR THE LIKE

(75) Inventors: Giacomo Orioli, Guastalla (IT); Zeno Zani, Bologna (IT)

(73) Assignee: Sasti S.R.L., Poviglio (IT)

( * ) Notice: Subject to any disclaimer, the term of this patent is extended or adjusted under 35 U.S.C. 154(b) by 0 days.

(21) Appl. No.: 09/864,221

(22) Filed: May 25, 2001

(65) Prior Publication Data
US 2001/0052271 A1 Dec. 20, 2001

(30) Foreign Application Priority Data
Jun. 1, 2000 (IT) .......................... RE00A0061

(51) Int. Cl.[7] ................................. G05G 1/14
(52) U.S. Cl. ................. 74/594.3; 74/594.1; 74/594.2
(58) Field of Search .................... 74/594.1–594.6; 280/259, 236; 474/141

(56) References Cited

U.S. PATENT DOCUMENTS

| | | | | |
|---|---|---|---|---|
| 4,181,034 A | * | 1/1980 | Daniel | 74/594.2 X |
| 4,309,043 A | * | 1/1982 | Brown | 280/236 |
| 4,793,208 A | * | 12/1988 | Bregnard et al. | 74/594.3 X |
| 4,816,009 A | * | 3/1989 | Philipp | 474/69 |
| 5,207,119 A | * | 5/1993 | Garneau | 74/594.3 |
| 5,549,314 A | * | 8/1996 | Sassi et al. | 280/259 |
| 5,566,590 A | * | 10/1996 | Wan | 74/594.3 |
| 5,636,554 A | * | 6/1997 | Amey | 74/594.3 |

FOREIGN PATENT DOCUMENTS

| | | | | |
|---|---|---|---|---|
| CH | 224 823 | | 12/1942 | |
| FR | 871 327 | | 4/1942 | |
| FR | 1 015 009 | | 8/1952 | |
| FR | 2562497 | * | 10/1985 | 74/594.3 |
| FR | 2 689 592 | | 10/1993 | |
| FR | 2 744 691 | | 8/1997 | |
| GB | 2050971 A | * | 1/1981 | 74/594.3 |
| JP | 2000-168668 | * | 6/2000 | 74/594.3 |
| JP | 2001-294188 | * | 10/2001 | 74/594.3 |
| WO | WO 86/07023 | * | 12/1986 | 74/594.3 |

* cited by examiner

Primary Examiner—Vinh T. Luong
(74) Attorney, Agent, or Firm—Browdy and Neimark

(57) ABSTRACT

The unit comprises two variable-length pedal cranks (20) having a common rotation pin (21) of transverse axis (A), and a mechanism (34, 35, 36) for varying the length of the two pedal cranks (20) on the basis of their angular position; the position of the axes of the pedals (25) in the vertical plane of projection defines, as the angular position of the pedal cranks (20) varies, an endless closed curve (F) about a reference axis (R) which is displaced by an angle of about 15 degrees forwards from the axis (N) passing through the center of the seat (11) of the bicycle and intersecting the axis (A) of the pin (21). The endless curve (F) comprises an upper portion, extending through at least 60 degrees of rotation of the pedal crank about the upper point of its intersection ($T_a$) with the reference axis (R), in which the length of the pedal crank (20) is less than the mean value ($L_M$) thereof, in the remaining part of the endless curve (F) the length of the pedal crank being greater than the mean value ($L_M$); the point in which the length of the pedal crank reaches its maximum value ($L_{max}$) is in a position between 40 and 120 degrees after the upper point of intersection ($T_a$)

5 Claims, 5 Drawing Sheets

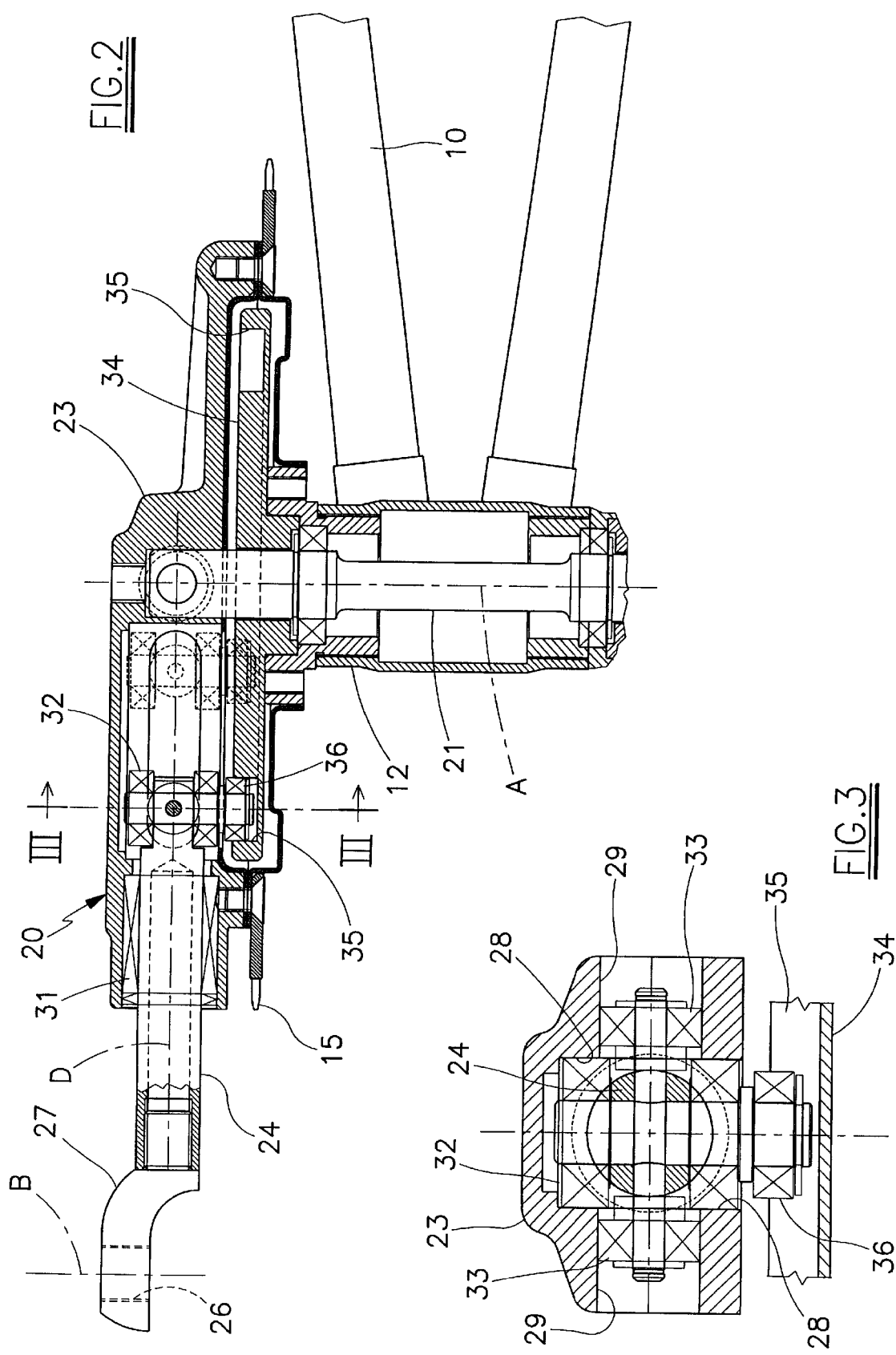

PEDAL-OPERATED DRIVE UNIT FOR BICYCLES OR THE LIKE

This invention relates to a pedal-operated drive unit for bicycles or the like.

As is well known, a bicycle normally comprises a pair of pedal cranks (or levers) having a common rotation pivot of transverse axis, at their ends there being positioned two respective pedals rotating about axes parallel to the pivot axis. The position of the pedal axes as the angular position of the pedal cranks varies defines a perfect circumference, the radius of which is currently dimensioned, for an adult of average stature, at 170 mm, this being the best compromise between transmission of muscular force to the wheels and frequency of pedalling.

In practice, cyclists taking part in sporting activities maintain a rhythm of 80–100 r.p.m. on the flat, this ensuring optimum comfort and roundness of pedalling (constant speed); on hills the rhythm is reduced, with maximum metabolic efficiency being sought at close to 60 r.p.m. This involves considerable muscular fatigue and, to reduce stress, the cyclist rises at intervals from the saddle to reduce muscle fatigue, especially of the quadriceps and calf, by working with a greater angle at the knee.

To improve muscular performance and efficiency during pedalling, solutions have been proposed in which the pedal cranks are of variable length and work in combination with cam means able to vary said length on the basis of the angular position of the two pedal cranks. With varying angular position of the pedal crank the position of the pedal axes in the plane of vertical projection defines an endless closed curve different from a circumference. To improve performance through this curve, the pedal crank is elongated during the thrust stage, i.e. during that angular portion extending roughly from the top dead centre to the bottom dead centre, and is consequently shortened during the remaining portion extending roughly from the bottom dead centre to the top dead centre.

This lengthening of the lever during the forward thrust portion gives a sensation of greater downward thrust; however this increase in the lever length also produces an increase in the pedal speed during the downward thrust and a reduction in this speed. The resultant effect is a loss of roundness during pedalling, which is undesirable especially over long distances and during acceleration. Moreover, when the athlete produces sudden acceleration (spurts) by raising his body from the saddle, he is hindered by the reduced length of the rear part of the pedal stroke, which proportionally reduces the force transmitted during traction.

Generally, said solutions do not improve, but indeed worsen, the efficiency of the musculo-articular system, mainly because they reduce the angle between the leg and the thigh at the top dead centre (with consequent excessive stress on the musculo-articular system), and compel the cyclist to rise onto the pedals because his quadriceps are excessively stretched, and in order to reduce the lactic acid accumulation therein.

An object of this invention is to provide a drive unit using pedals of variable length, which is able to overcome said drawbacks and improve the working conditions of the musculo-articular system.

This and further objects are attained by the present invention as characterised in the claims.

The invention is described in detail hereinafter with the aid of the accompanying figures which illustrate one embodiment thereof by way of non-limiting example.

FIG. 2 is a section on the plane II—II of FIG. 1.

FIG. 3 is a section on the plane III—III of FIG. 2.

Figure 4:
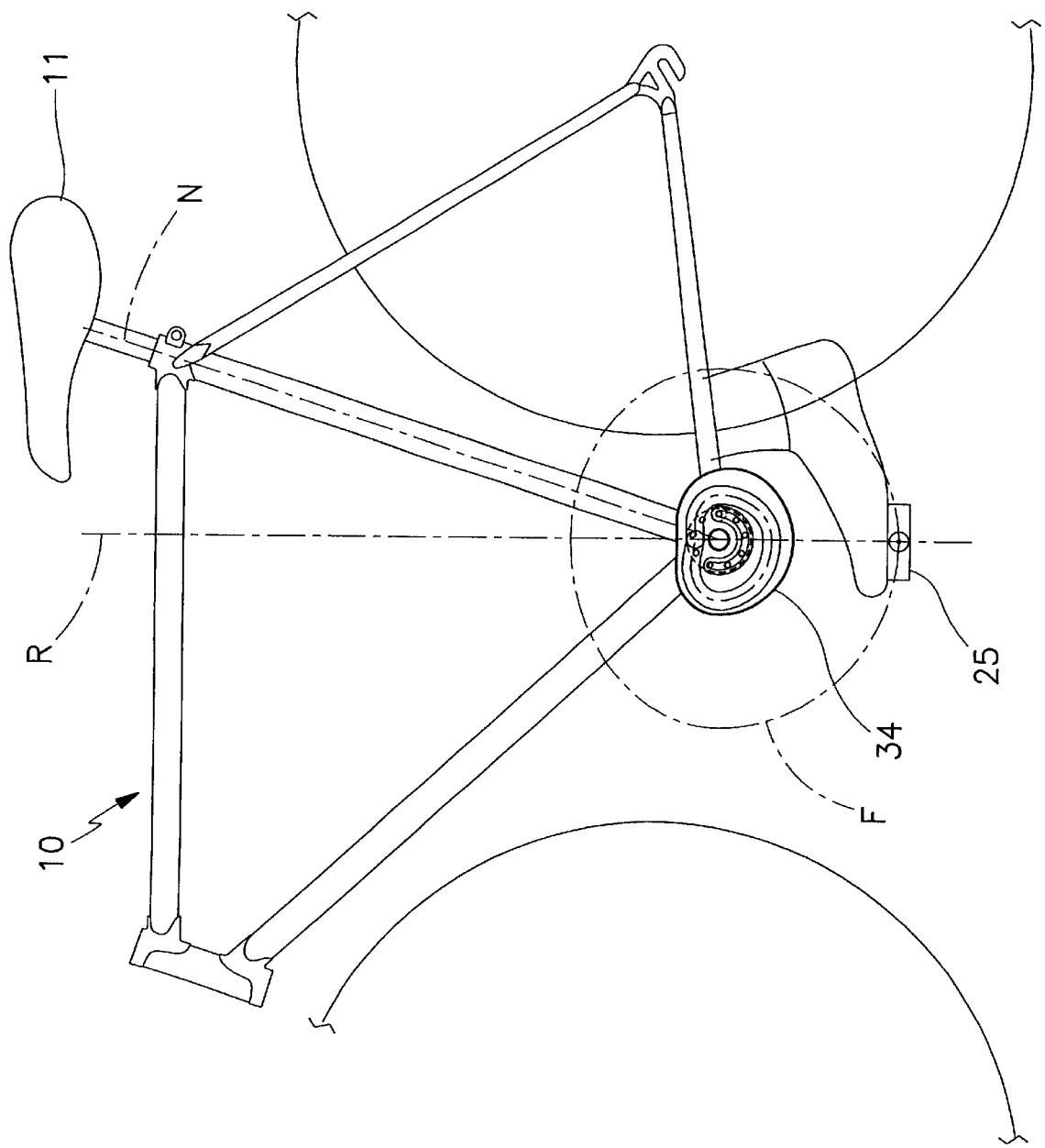
FIG. 4 is a schematic view of the frame and of the curve along which the pedal axis moves.

FIG. 4 shows a usual bicycle frame 10, with which a saddle 11 is associated. At the lowest point of the frame 10 there is provided a sleeve 12, in which a pin 21 is pivoted on a horizontal transverse axis A. To each end of the pin 21 there is rigidly fixed a respective variable-length pedal crank 20, on the free end of which there is positioned a respective pedal 25 rotatable about a horizontal axis B parallel to the axis A of the pin 21.

Figure 1:
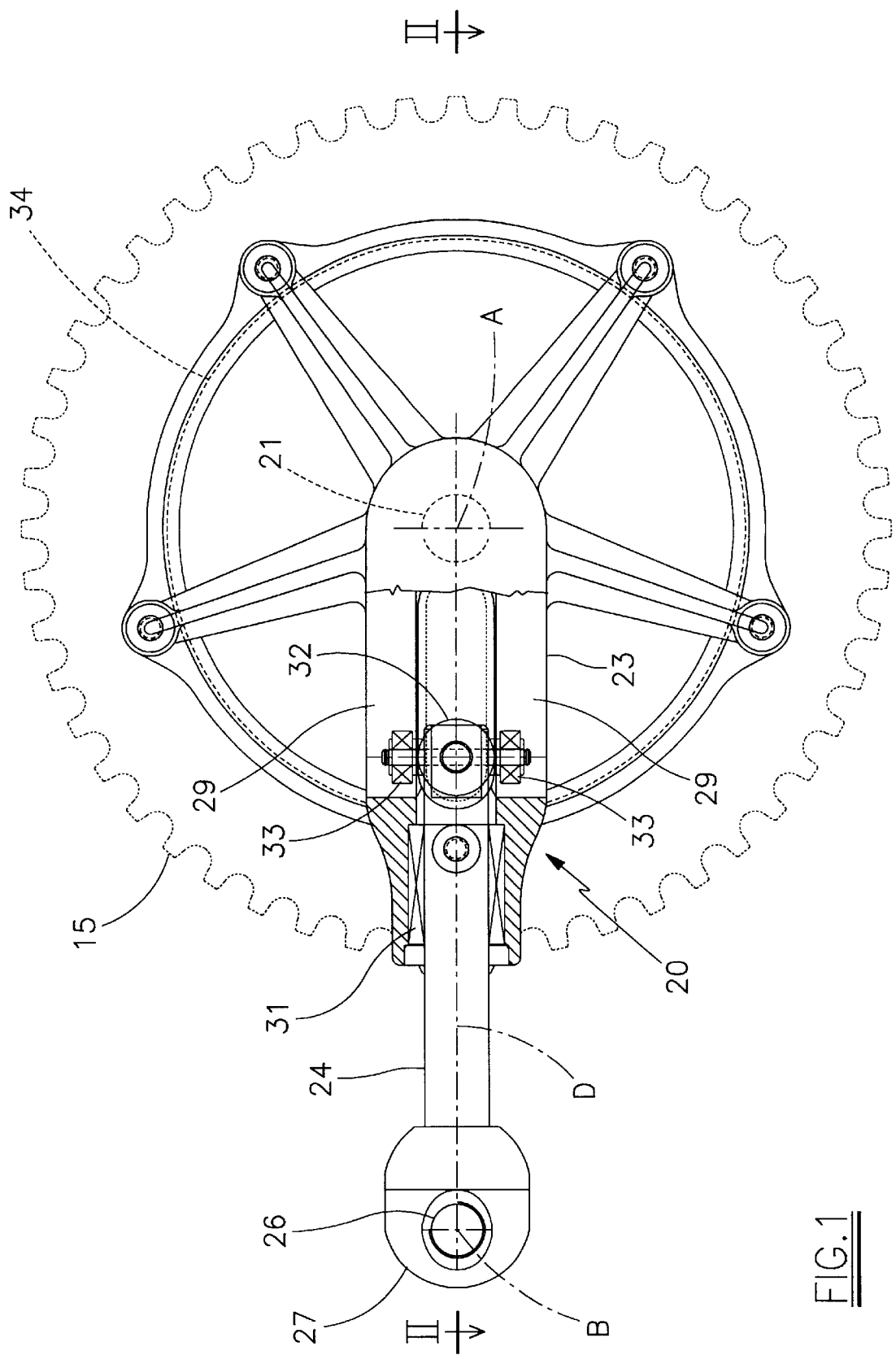
FIG. 1 is a partly sectional vertical elevation of the unit of the invention.

The pedal 25 is of any known type and is shown only schematically in FIG. 4. Of the pedal crank 20, FIGS. 1 and 2 show only the free end 27, which presents a hole 26 for receiving the rotation pin of the pedal 25. Moreover, the figures show only one pedal crank 20, the other pedal being identical and disposed anti-symmetrically.

Each pedal crank 20 comprise s a first portion 23, rigid with the pin 21, and a second portion 24, coupled to the first portion 23 telescopically such that it can slide only axially along the axis D of the pedal crank 20.

Rigidly fixed to the first portion 23 of one of the two pedal cranks 20 there is at least one ring gear 15 forming part of the unit which transmits the movement (rotation) of the pedal cranks to the bicycle wheels (usually to only the rear wheel).

In the embodiment illustrated in the figures, the first portion 23 is of roughly tubular shape, within which there slides a part of the second portion 24 presenting three tracks 28 and 29 extending in the direction of the axis D.

The second portion 24 is guided by a bush of plastic material 31 rigid with the first portion 24, and by three idle rollers 32 and 33 slidable along the tracks 28 and 29.

With each pedal crank 20 there is associated a respective cam means arranged to vary the length of the pedal crank 20 on the basis of the angular position of this latter. In particular, the cam means comprises a plate 34 fixed rigidly to the frame 10 in a position perpendicular to the axis A, and presenting an endless bilateral track 35 about the axis A. In the track 35 there is slidingly engaged an idle roller 36 pivoted on the second portion 34 of the pedal crank 20.

In operation, the cyclist rests in known manner on the saddle 11 and with the feet operates the pedals 25 to rotate the pedal cranks 20 in an anti-clockwise direction with reference to the figures. During each revolution of the pedal crank 20, the idle roller 36 runs along the track 35, the distance of which from the axis of rotation A varies with varying angle of the pedal crank 20, with the result that the axial position of the second portion 34 and hence the length of the pedal crank 20 varies.

Thus the position of the axes B of the pedals 25 in the vertical plane of projection defines, as the angular position of the pedal cranks 20 varies, an endless closed curve (indicated by F in FIGS. 4 and 5) about a reference axis R which is displaced by an angle of about 15 degree s forwards from the axis N passing through the centre of the seat of the bicycle and intersecting the axis A of the pin. In the large majority of bicycles currently in use said axis N is displaced rearwards through an angle of between 14 and 18 degrees from the vertical axis which intersects the axis A, hence the reference axis R coincides with the vertical axis.

According to the invention, the curve F comprises an upper portion F1, extending through at least 60 degrees of rotation of the pedal crank 20 about the upper point of intersection (indicated by $T_a$ in FIG. 5) between the curve F and the reference axis R, in which the length L of the pedal crank 20 is less than the mean value $L_M$ thereof; in the remaining part of the curve F, the length L of the pedal crank 20 is greater than the mean value $L_M$. Moreover, the point in which the length of the pedal crank 20 reaches the maximum value $L_{max}$ is in a position between 40 and 120 degrees after the upper point of intersection $T_a$.

Figure 5:
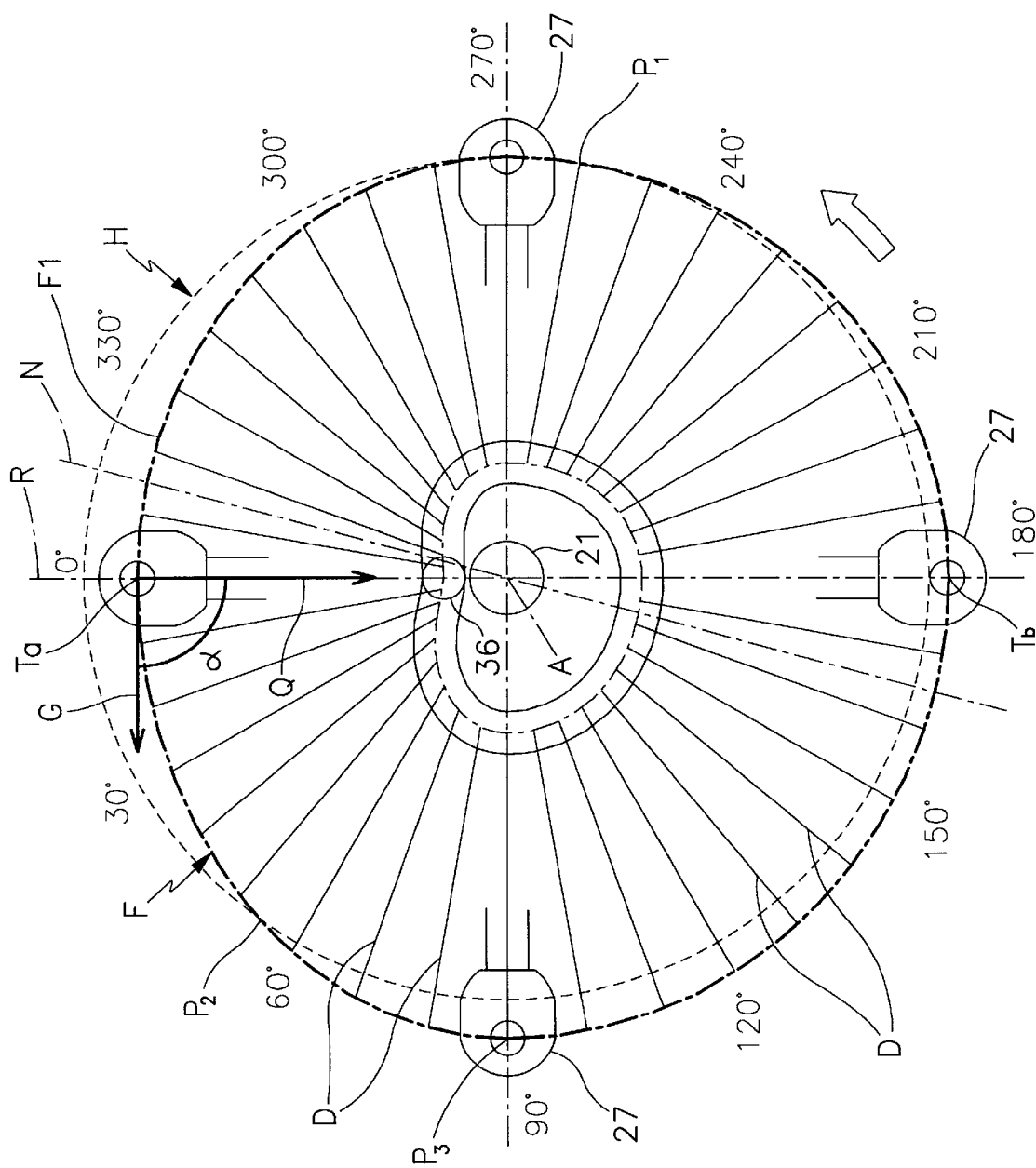
FIG. 5 shows on an enlarged scale the curve F of FIG. 4, with further details.

In addition, that half line G tangential to the curve F at the upper point of intersection $T_a$ extending forwards (in the direction of rotation of the pedal crank) forms an angle α less than or equal to 90 degrees with the half line Q positioned on the axis R and facing the axis A (see FIG. 5). In other words, at the point $T_a$, the length L of the pedal crank tends to decrease or at least remain constant.

Preferably, the point in which the length of the pedal crank 20 reaches its minimum value is in a position between 10 degrees after and 10 degrees before the upper point of intersection. In particular, as shown in the figures, said minimum value is reached at the point $T_a$.

Preferably, said upper portion F1 of the curve F extends through about 120–90 degrees prior to the upper point of intersection $T_a$ and through about 30–60 degrees after the upper point of intersection $T_a$. Finally, the difference between the maximum length value $L_{max}$ and the minimum length value $L_{min}$ reached by the pedal crank 20 is between 10 and 30 percent of the mean value $L_M$, where $L_M$ is the value of the radius of the equivalent circumference H having the same length as the curve F. In the example shown in the figures:

$$(L_{max}-L_{min})/L_M=0.217.$$

The scheme of FIG. 5 shows the track 35 in which the roller 36 slides. The curve F defines the positions assumed by the pedal axis B. 36 different positions of the axis D of the pedal crank are illustrated, positioned at 10 degrees apart (some of these also show the free end 27 of the pedal crank 20). In addition, to better highlight the particular shape of the curve F, the equivalent circumference H is shown having its centre on the axis A and length equal to that of the curve F (and radius of length $L_M$), which represents the path of the pedal axis B in the traditional case in which the pedal crank is of fixed length $L_M$.

The curve F illustrated in the figures comprises an upper portion F1 which commences at the point $P_1$ positioned at about 260 degrees (100 degrees prior to the point $T_a$) and terminates at the point $P_2$ positioned between 50 and 60 degrees. Along this portion $F_1$, the length L of the pedal crank maintains values less than the mean value $L_M$; in particular, the length L decreases gradually until it reaches the minimum value $L_{min}$ at the upper point of intersection $T_a$, corresponding to the 0° position, and then increases gradually until it reaches the mean value $L_M$ at the point $P_2$.

Along the lower portion of the curve F, which commences at the point $P_2$ and terminates at the point $P_1$, the length L of the pedal crank maintains values greater than the mean value $L_M$; in particular, the value L increases gradually until it reaches its maximum value at the point $P_3$ corresponding to the 90° position, then decreases gradually until it reaches the mean value $L_M$ at the point $P_1$.

Figure 6:
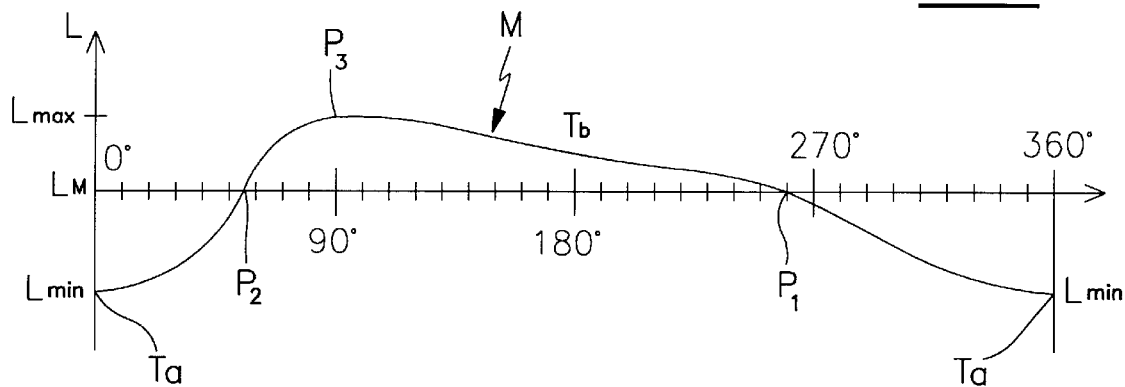
FIG. 6 is a graph showing the variation in the length of the pedal crank 20 about the mean value $L_M$ (value of the radius of the equivalent circumference).

The graph of FIG. 6 shows, in Cartesian coordinates, a curve M which indicates the variation in the length L of the pedal crank 20. The horizontal axis indicates the angular position of the pedal crank and the vertical axis indicates the variation in the length L of the pedal crank about its mean value $L_M$.

Moreover, the mean value $L_M$ of the pedal crank length is between 98 and 90 percent of the length of the traditional pedal crank for persons of the same stature.

Specifically, whereas for adults of average stature (i.e. in the large majority of bicycles currently in use) the length of the pedal crank is 170 mm, in the unit of the present invention best results were obtained by making the mean value $L_M$ of the curve F equal to 160.8 mm. At the same time $L_{max}$ was fixed at 175 mm and $L_{min}$ at 140 mm.

Figure 7:
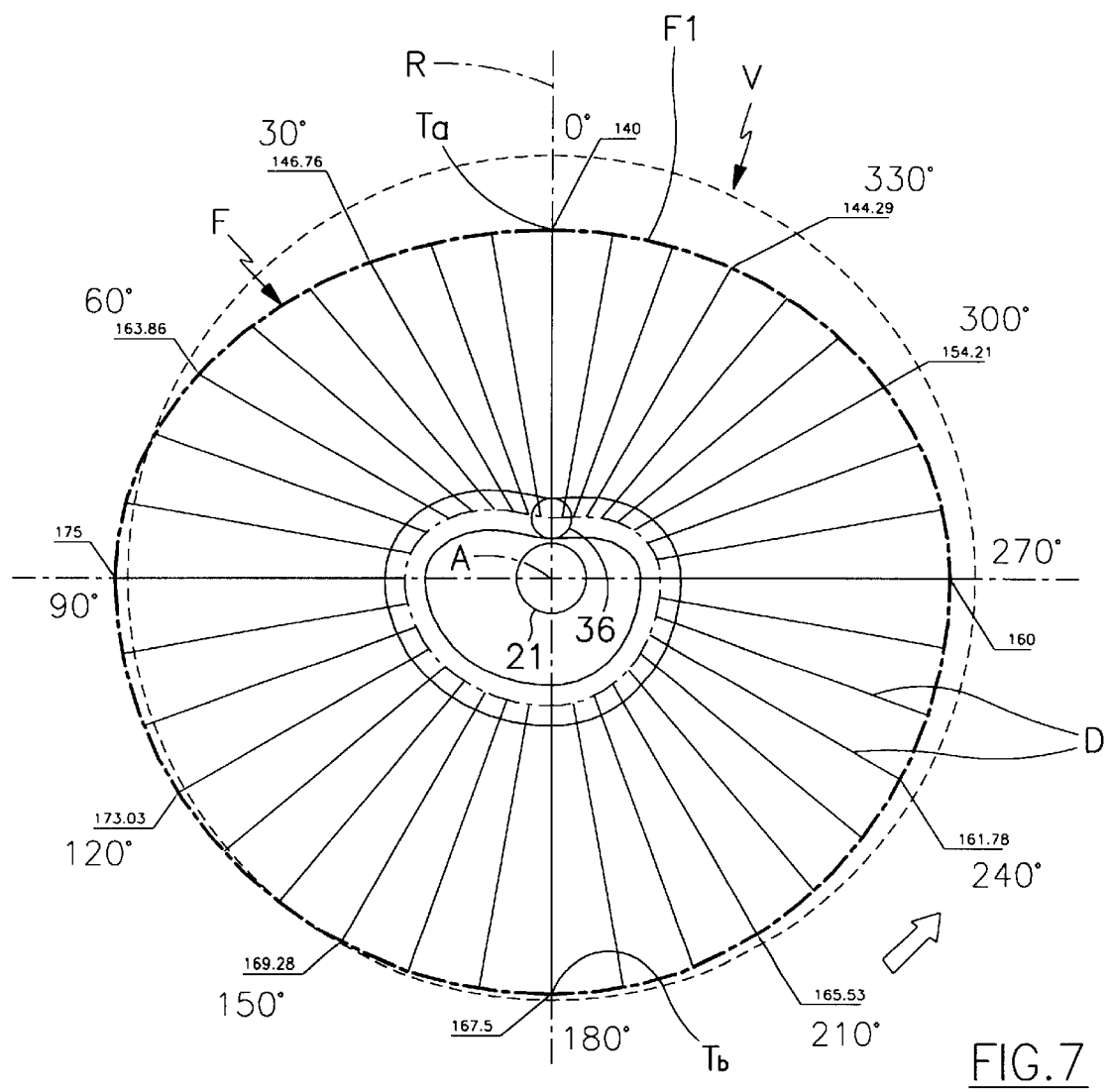
FIG. 7 shows the curve F of FIG. 5 with dimensions.

FIG. 7 shows the curve F (the same as FIG. 5), together with dimensional values, for a bicycle for an adult of average stature. It also shows, as a comparison for better highlighting the characteristics of the curve F, the circumference V described by the pedal axis in the traditional case in which the pedal crank has a length of 170 mm.

By virtue of the aforedescribed characteristics of the curve F, numerous advantageous behavioural aspects have been noted experimentally compared with traditional drive units, such as to substantially improve muscular performance and efficiency during pedalling.

In particular, it has been found that the leg undergoes movements more adapted to the articulation of the knee; the explanation lies in the fact that a smaller angle is formed between the leg and the thigh at the top dead centre, which improves contactile efficiency of the quadriceps and produces less compression of the knee-cap on the femoral condyles.

Moreover, because of the lesser circling of the leg (smaller length of the curve F) compared with traditional bicycles, the frequency of pedalling increases proportionally, so contributing to the improved performance of the invention.

Although the shortening of the pedal crank along that part of the curve F close to the upper point of intersection $T_a$ may appear theoretically to be an advantageous factor with regard to the production of mechanical work, and such as to annul the muscular advantage obtained for leg articulation, in contrast it has been surprisingly found from long trials carried out on the road that performance is substantially improved compared with traditional bicycles.

In particular, the following has been noted:

starting from rest while seated on the saddle is improved because of the ease of passage of the knee through the upper part of the pedal stroke, the desired cruising speed being reached without excessive muscular fatigue;

at constant speed the sensation of roundness and fluidity compared with the traditional pedalling situation is improved because of the lesser rising of the knee compared with the traditional situation;

when in the seated position the acceleration and progression along a flat path is clearly improved, and the need to rise on the pedals is not felt;

short sprinting on the pedals (as in a spurt) is similar to the traditional situation, because the path (i.e. the curve F) undergone by the pedals is substantially of the same length;

on steep hills (exceeding 10%), an optimum muscular thrust and contraction sensation has been observed, because of the lengthening of the pedal crank during the thrust stage; during the return stage when in a high position it has been noted, with advantageous effect, that the knee rapidly passes to the thrust stage without reaching points which are too high; it is totally unnecessary to rise on the pedals (which in contrast is typical on steep hills with traditional bicycles) and the sensation of roundness and fluidity is excellent, even at low pedalling rate (50–60 r.p.m.);

on less steep hills the situation is similar to the above case; agile and lengthy regimes can be maintained without unpleasant muscular sensations, it being simple to maintain constant pedalling with time.

Numerous modifications of a practical and applicational nature can be made to the invention, but without deviating from the scope of the inventive idea as claimed below.

What is claimed is:

1. A pedal-operated drive unit for a bicycle, comprising two variable-length pedal cranks (20) having a common rotation pin (21) of transverse axis (A), and means (34, 35, 36) for varying the length of the two pedal cranks (20) on the basis of their angular position, the position of the axes of the pedals (25) in the vertical plane of projection defining, as the angular position of the pedal cranks (20) varies, an endless closed curve (F) about a reference axis (R) which is displaced by an angle of about 15 degrees forwards from the axis (N) passing through the center of a seat (12) of the bicycle and intersecting the axis (A) of the pin (21), characterized in that said endless curve (F) comprises the following characteristics:

an upper portion, extending through at least 60 degrees of rotation of the pedal crank about the upper point of its intersection ($T_a$) with the reference axis (R), in which the length (L) of the pedal crank (20) is less than the mean value ($L_M$) thereof, in the remaining part of the endless curve (F) the length of the pedal crank being greater than the mean value ($L_M$), the point in which the length of the pedal crank reaches its maximum value ($L_{max}$) being in a position between 40 and 120 degrees after the upper point of intersection ($T_a$).

2. A drive unit as claimed in claim 1, characterised in that the tangent to the curve (F) at the upper point of intersection ($T_a$) forms an angle $\alpha$ less than or equal to 90 degrees with that half line extending forwards perpendicular to the reference axis (R).

3. A drive unit as claimed in claim 1, characterised in that the point in which the length of the pedal crank reaches its minimum value is in a position between 10 degrees after and 10 degrees before the upper point of intersection ($T_a$).

4. A drive unit as claimed in claim 1, characterised in that said upper portion (F1) of the endless curve (F) extends through about 120–90 degrees prior to the upper point of intersection ($T_a$) and through about 30–60 degrees after the upper point of intersection ($T_a$).

5. A drive unit as claimed in claim 1, characterised in that the difference between the maximum length value ($L_{max}$) and the minimum length value ($L_{min}$) reached by the pedal crank (20) is between 10 and 30 percent of the mean value ($L_M$).

* * * * *